(12) United States Patent
Ogren (10) Patent No.: US 8,442,580 B2
(45) Date of Patent: May 14, 2013

(54) INTERACTIVE PHONE BOOK

(75) Inventor: Per Ogren, Malmo (SE)

(73) Assignees: Sony Corporation, Tokyo (JP); Sony Mobile Corporation, Lund (SE)

( * ) Notice: Subject to any disclaimer, the term of this patent is extended or adjusted under 35 U.S.C. 154(b) by 271 days.

(21) Appl. No.: 10/580,592

(22) PCT Filed: Nov. 2, 2004

(86) PCT No.: PCT/EP2004/012486
§ 371 (c)(1),
(2), (4) Date: Jan. 19, 2007

(87) PCT Pub. No.: WO2005/053279
PCT Pub. Date: Jun. 9, 2005

(65) Prior Publication Data
US 2007/0130200 A1    Jun. 7, 2007

Related U.S. Application Data

(60) Provisional application No. 60/565,651, filed on Apr. 27, 2004.

(30) Foreign Application Priority Data

Nov. 27, 2003   (EP) .................................... 03388080
Apr. 23, 2004   (EP) .................................... 04388029

(51) Int. Cl.
*H04M 1/00* (2006.01)
(52) U.S. Cl.
USPC ..................... 455/551; 455/550.1; 455/414.1; 455/424; 455/418; 455/566; 379/93.17; 379/93.23; 345/594; 715/762

(58) Field of Classification Search .................. 455/457, 455/565, 566, 418, 424, 466, 412.1–412.2, 455/456.1, 414.4, 415, 550.1, 556.2, 414.1, 455/551; 379/354, 355, 88.03, 93.17, 93.23; 707/104.1; 345/594; 715/762
See application file for complete search history.

(56) References Cited

U.S. PATENT DOCUMENTS 6,222,921 B1 *  4/2001  Mugura et al. ................ 379/354
6,288,718 B1 *  9/2001  Laursen et al. ............... 715/800

(Continued)

FOREIGN PATENT DOCUMENTS

CN     1431814 A     7/2003
CN     1447266 A     10/2003

(Continued)

OTHER PUBLICATIONS

International Search Report for PCT/EP2004/012486 mailed Feb. 24, 2005.

(Continued)

*Primary Examiner* — Vladimir Magloire
*Assistant Examiner* — Babar Sarwar
(74) *Attorney, Agent, or Firm* — Myers Bigel Sibley & Sajovec, (57) ABSTRACT

In a telecommunications device a number or address is selected from a stored list for initiating a call or sending a message from the telecommunications device to the number or address. The list includes names and one or more numbers and/or addresses corresponding to each name. At least some of said stored names are displayed, and one of the displayed names is highlighted. The highlighted name is displayed together with a default one of the one or more numbers and/or addresses corresponding to the highlighted name.

16 Claims, 4 Drawing Sheets

U.S. PATENT DOCUMENTS

| | | | |
|---|---|---|---|
| 7,358,960 B2 * | 4/2008 | Mak | 345/169 |
| 2003/0195018 A1 * | 10/2003 | Lee | 455/566 |
| 2009/0156178 A1 * | 6/2009 | Elsey et al. | 455/414.1 |

FOREIGN PATENT DOCUMENTS

| | | |
|---|---|---|
| EP | 1 229 703 A2 | 8/2002 |
| JP | 5-113956 | 5/1993 |
| JP | 10-126486 | 4/1998 |
| JP | 2001-177626 | 6/2001 |
| JP | 2001-309016 | 11/2001 |
| RU | 18 125 U1 | 5/2001 |
| RU | 2 193 822 | 11/2002 |
| WO | WO 99/43136 | 8/1999 |

OTHER PUBLICATIONS

A5401CA User's Guide, au (KDDFI), Okinawa Cellular Phones, Aug. 2003, Version 6, (URL:http://www.au.kiddi.com/torisetsu/pdf/5401ca/5401_torisetu.pdf). No translation available.

* cited by examiner

INTERACTIVE PHONE BOOK

RELATED APPLICATIONS

The present application is a 35 U.S.C. §371 national phase application of PCT International Application No. PCT/EP2004/012486, having an international filing date of Nov. 2, 2004 and claiming priority to European Patent Application No. 03388080.8, filed Nov. 27, 2003, European Patent Application No. 04388029.3 filed Apr. 23, 2004 and U.S. Provisional Application No. 60/565,651 filed Apr. 27, 2004, the disclosures of which are incorporated herein by reference in their entireties. The above PCT International Application was published in the English language and has International Publication No. WO 2005/053279.

TECHNICAL FIELD OF THE INVENTION

The invention relates to a method of selecting a number or address from a list stored in a telecommunications device for initiating a call or sending a message from the telecommunications device to said number or address, said list comprising names and one or more numbers and/or addresses corresponding to each name, the method comprising the steps of displaying at least some of said stored names, and highlighting one of said displayed names. The invention also relates to a telecommunications device adapted to select a number or address from a list stored in the telecommunications device.

DESCRIPTION OF RELATED ART

Many telecommunications devices of today, such as mobile telephones, have a built-in list in the form of a so-called phone book in which a number of contact persons and their corresponding phone numbers or e-mail addresses are stored. To make a call or send a message to one of the contacts in the list, the list, or at least a part of it, is shown to the user on a display, the relevant name is selected from the list, and the call can be initiated or the message sent.

In some devices it is also possible to store more than one number/address for each person, e.g. home, work, mobile or e-mail. To make a call or send a message from such a device today the user selects a name of a contact person, gets a new list showing the phone numbers/addresses of that contact, and then the user can choose one of these numbers to call or send a message to. This means that compared to the devices that store only one number per contact, an additional key press is needed to initiate the call, which is annoying to many users, especially users who use the phone book frequently.

Even in these devices some contacts will be stored with only one number. However, for such contacts the user will still have to select the name and get the list of corresponding numbers. Thus the list with numbers of that contact will be showed anyway; it will just only comprise one single number, and especially in these cases the additional key press needed to obtain the list seems annoying. In other words, this method is consistent in use, because the key sequence is the same for all contacts, but an additional key press is always needed.

One solution could be to select the number directly, when there is only one number stored for a contact person, and then only use the extra list for contact persons having more than one number. In this case the extra key press is avoided for entries with only one number, but this solution is inconsistent, because the number of key presses needed to initiate a call differs depending on how many numbers there are stored for the selected contact person, and since this can not always be remembered by the user there is a risk of mistakes; e.g. the user may forget to press "call" when a call should be initiated to a contact person for which only one number is stored.

Therefore, it is an object of the invention to provide a method of making phone calls or sending messages with as few key presses as possible and which has a consistent interaction design regardless whether one single or multiple numbers is/are entered for a given contact person.

SUMMARY

According to the invention the object is achieved in that the method further comprises the step of displaying the highlighted name together with a default one of the one or more numbers and/or addresses corresponding to the highlighted name.

In this way, when entering the contact list a number can be called directly with one key press. This means that one key press is saved compared to the prior art method. The suggested solution also has other advantages. If a wrong contact was selected, the user does not have to go one step back; he can just select another contact by e.g. up or down press on e.g. a 4-way navigation device. Further, many users have only one number per contact (for all contacts), and with this solution these users never have to use the additional key press. Another advantage is that the same interaction design can be used for an internal phone book having the possibility of several numbers per contact, a SIM card phone book, which normally only allows a single number per contact, and e.g. a call list, i.e. a list of recent calls to or from the device, which also uses a single number per item.

There is the same look and the same interaction (direct Call) for contacts with several numbers/addresses per name and for SIM phone book, service numbers, information numbers, fixed numbers, SOS numbers, and user's own numbers. Whatever the list (including call list), a call is set up on the first press.

Further, the method allows for easy and intuitive multiple select, ire. when the same message is to be sent to several recipients.

Very few key presses are needed to make a call. When entering the contact list, a number can be called directly with one key press. Only two key presses are needed when using e.g. a shortcut from standby mode to phone book, and four key presses when using the menu.

When the method further comprises the step of indicating together with the default number or address whether the list comprises more than one number or address corresponding to the highlighted name, it is easy for the user to see if there are other numbers stored for that contact than the displayed default number or address.

Expediently, the method further comprises the step of selecting the displayed default number or address, if this number or address is the only number or address in the list corresponding to the highlighted name, so that in this case the number is selected directly.

Further, the method may comprise the steps of scrolling, if it is indicated that the list comprises more than one number or address corresponding to the highlighted name, and if the displayed default number or address is not the one to which a call should be initiated or a message sent, through the numbers or addresses corresponding to the selected name by means of a 4-way navigation device until the number or address to which a call should be initiated or a message sent is displayed; and selecting, when the number or address to which a call should be initiated or a message sent is displayed, the displayed number. This allows the user in a simple way to move to another one of the stored numbers/addresses if the default number is not the intended one, still without having to use an additional key press to go to a separate list with the numbers/addresses of that contact person.

In an expedient embodiment, the default one of the one or more numbers and/or addresses corresponding to the highlighted name depends on a mode of said telecommunications device. Thus the default number, i.e. the first shown number when a contact person is highlighted, can be selected by the device in dependence of its mode. This is very efficient especially for messaging. When entering the phone book to send an e-mail, the contact person may be displayed with the e-mail address as default. When sending an SMS/MMS, the mobile number can be default. The number or address can then be chosen with one key press.

Alternatively, the default number can be user-selectable, so that when the user enters the numbers in the phone book, or at a later stage, one of the numbers or addresses is selected as the default number.

As mentioned, the invention also relates to a telecommunications device adapted to select a number or address from a list stored in the telecommunications device for initiating a call or sending a message from the telecommunications device to said number or address, said list comprising names and one or more numbers and/or addresses corresponding to each name, the telecommunications device being arranged to display at least some of said stored names, and highlight one of said displayed names. When the telecommunications device is further arranged to display the highlighted name together with a default one of the one or more numbers and/or addresses corresponding to the highlighted name, a device is achieved on which phone calls can be made or messages sent with as few key presses as possible and which has a consistent interaction design regardless whether one single or multiple numbers is/are entered for a given contact person.

When the device is further arranged to indicate together with the default number or address whether the list comprises more than one number or address corresponding to the highlighted name, it is easy for the user to see if there are other numbers stored for that contact than the displayed default number or address.

Expediently, the device is further arranged to select the displayed default number or address, if this number or address is the only number or address in the list corresponding to the highlighted name, so that in this case the number is selected directly.

Further, the device may be arranged to scroll, if it is indicated that the list comprises more than one number or address corresponding to the highlighted name, and if the displayed default number or address is not the one to which a call should be initiated or a message sent, through the numbers or addresses corresponding to the selected name by means of a 4-way navigation device until the number or address to which a call should be initiated or a message sent is displayed; and select, when the number or address to which a call should be initiated or a message sent is displayed, the displayed number. This allows the user in a simple way to move to another one of the stored numbers/addresses if the default number is not the intended one, still without having to use an additional key press to go to a separate list with the numbers/addresses of that contact person.

In an expedient embodiment, the default one of the one or more numbers and/or addresses corresponding to the highlighted name depends on a mode of said telecommunications device. Thus the default number, i.e. the first shown number when a contact person is highlighted, can be selected by the device in dependence of its mode. This is very efficient especially for messaging. When entering the phone book to send an e-mail, the contact person may be displayed with the e-mail address as default. When sending an SMS/MMS, the mobile number can be default. The number or address can then be chosen with one key press.

Alternatively, the default number can be user-selectable, so that when the user enters the numbers in the phone book, or at a later stage, one of the numbers or addresses is selected as the default number.

BRIEF DESCRIPTION OF THE DRAWINGS

The invention will now be described more fully below with reference to the drawings, in which.

DETAILED DESCRIPTION OF EMBODIMENTS

Figure 1:
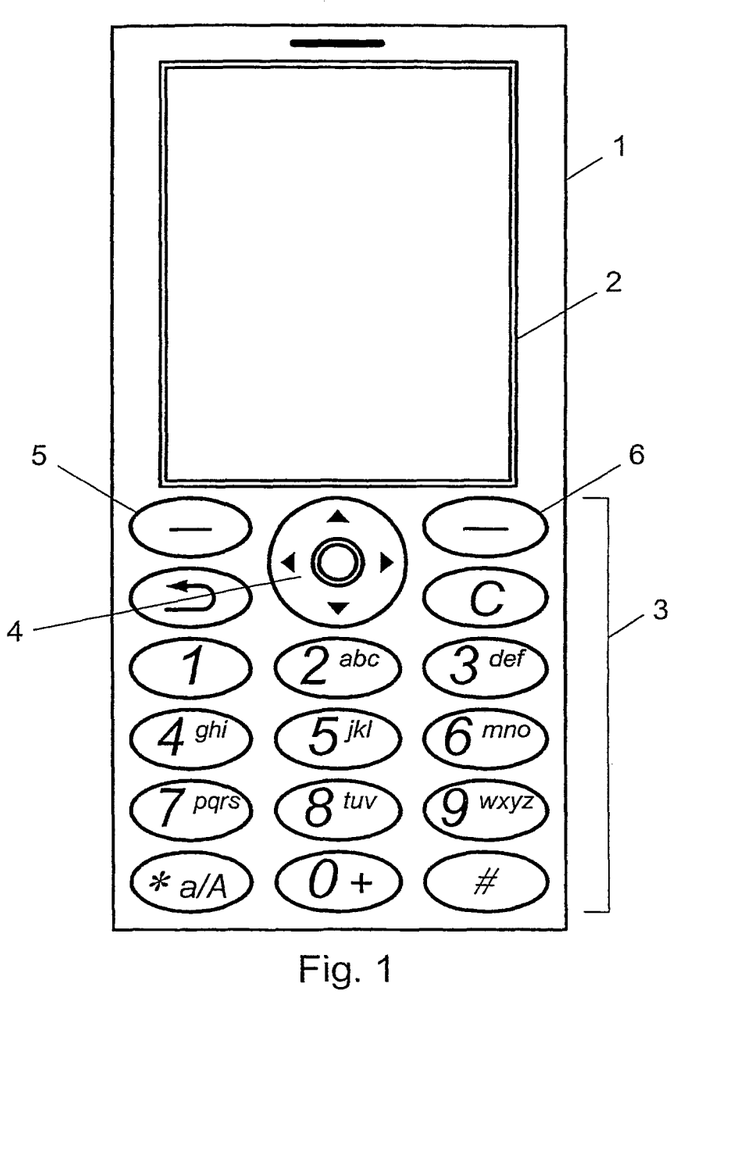
FIG. 1 shows a mobile telephone in which the invention may be used.

FIG. 1 shows an example of a device in which the invention can be used. The shown device is a mobile telephone 1, e.g. a GSM telephone and/or a UMTS telephone. Other types of telephones are CDMA, PDC, CDMA 2000 and TDMA. However, it should be noted that the invention could be used in other types of devices also. As examples, PDA's (Personal Digital Assistant) and computers may be mentioned.

The telephone 1 is equipped with a display 2 and a keypad 3. The keys of the keypad 3 are used for entering information into the telephone. This information may be of many various types, such as telephone numbers, address information, instructions to the telephone and text messages to be sent to another telephone. It is noted that in this case the keypad 3 includes a 4-way navigation device 4 and two so-called softkeys 5, 6, the function of which will be described later. The 4-way navigation device 4 can be activated in the middle and corresponding to the four directions up, down, left and right, and it can be arranged as five separate keys or combined in e.g. a rocker key or a joystick. The display 2 is used for presentation of information to the user of the mobile telephone. Also the presented information may be of various types, such as telephone numbers, address information, indications from the telephone, text messages received from another telephone, or text messages entered by the keypad 3 for later transmission to another telephone.

In a typical use of the telephone 1 a user wants to make a call or send a message to a person whose name and telephone number and/or e-mail address is stored in the phone in the form of a list, which is also called the phonebook. A typical way of finding the number searched for in the phonebook in prior art phones is described below.

Figure 2:
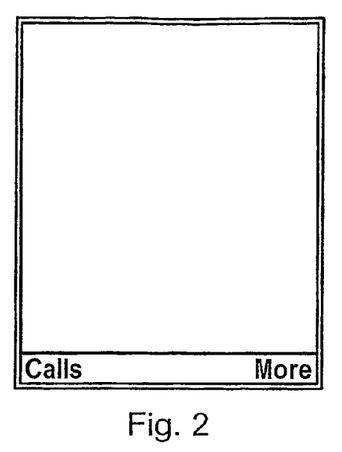
FIG. 2 shows an example of a display in a stand-by mode.

Usually, the phone will be in a stand-by mode when not in use. In this mode the display 2 may be switched off, or it may show a wallpaper or a screen saver. Here, however, FIG. 2 shows a toolbar at the lower edge of the display in order to explain the function of the two softkeys 5, 6. The toolbar shows two words "Calls" and "More", which are placed directly over the two keys 5, 6 and defines the function of the two keys. Thus the keys will always have the function described in the toolbar.

Figure 3:
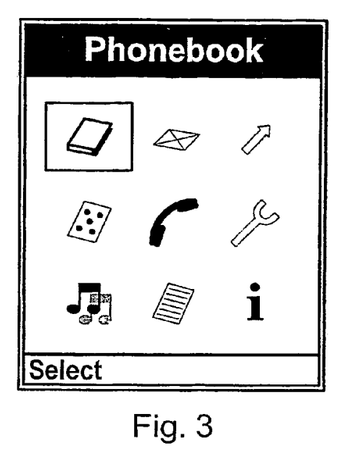
FIG. 3 shows an example of a menu display.

When the user wants to make a call, he can press a key, e.g. the 4-way navigation device 4, and the display will typically show a menu as shown in FIG. 3. The menu allows the user to select a number of different functions, such as "Phonebook", "Messages","Games" or "Settings",which are each shown by an icon on the display. One of the icons will be highlighted and/or surrounded by a frame and the corresponding function described at the top of the display, and this function can be selected by pressing the softkey 5, which now has the function "Select". If the wanted function is not the highlighted one, the frame can be moved to one of the other icons by use of the 4-way navigation device 4. In FIG. 3 the function "Phonebook" is highlighted and can be selected.

Figure 4:
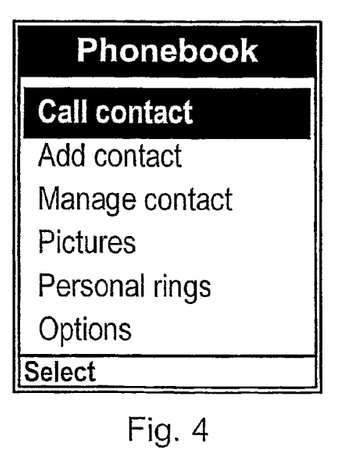
FIG. 4 shows an example of a display presenting a number of phonebook options.
Figure 5:
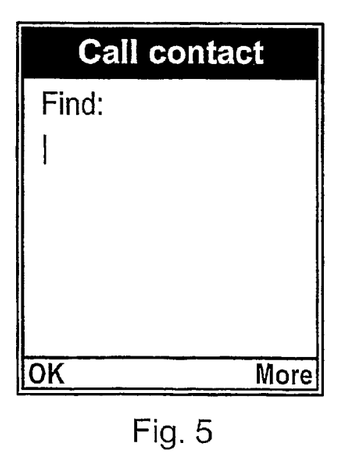
FIG. 5 shows an example of a display requesting the user to enter e.g. the first letter of a name.

When the function "Phonebook" is selected by pressing the softkey 5, the display may now present a number of possibilities as shown in FIG. 4. Again one of the possibilities is highlighted and can be selected by the key 5, and if the highlighted possibility is not the intended one, another one can be highlighted by use of the 4-way navigation device 4. In FIG. 4 "Call contact" is highlighted, and the user will select this possibility since he intends to make a call. In the next step the user is on the display requested to enter e.g. the first letter of the name of the contact person he is looking for, so that he does not have to go through the whole list every time. This is shown in FIG. 5. Alternatively, a position number may be entered if the list is ordered according to such numbers, which can be the case e.g. for a phonebook stored on a SIM card.

Figure 6:
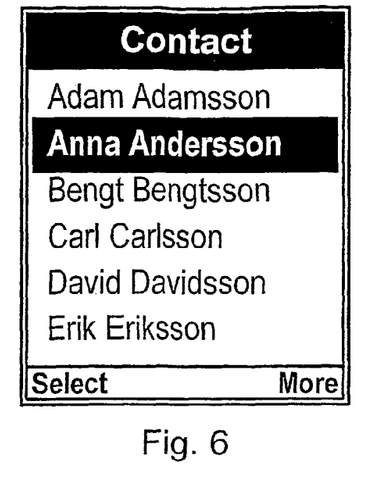
FIG. 6 shows an example of a display presenting a list of contact persons according to prior art.

After having entered a letter or a number, or without entering anything, the user presses "OK" (i.e. the softkey 5) to go to the next picture, which is shown in FIG. 6. Here the names stored in the phonebook, or at least some of them, are listed beginning with the letter just entered, or—if no letter was entered—listed from the beginning. Also here one name is highlighted and can be selected by the softkey 5, and if the highlighted name is not the in-tended one, another name can be highlighted by use of the 4-way navigation device 4.

Figure 7:
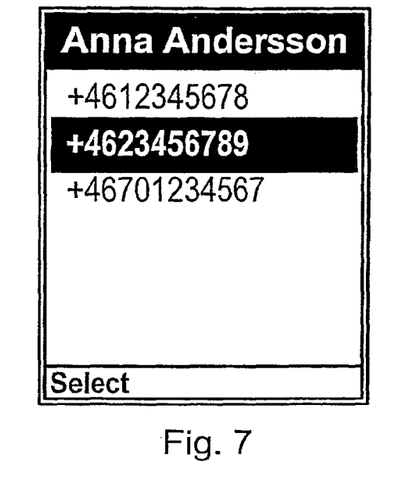
FIG. 7 shows an example of a display presenting a list of numbers for a given contact person.
Figure 8:
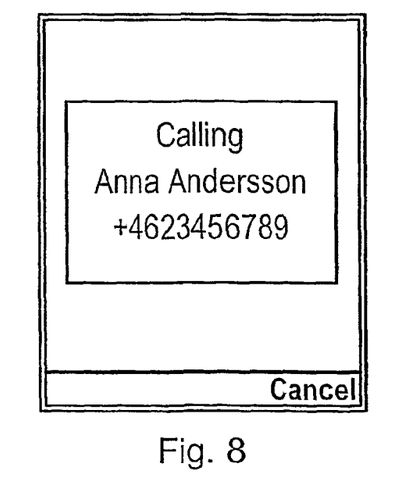
FIG. 8 shows an example of a display indicating that a call is initiated.

Since several numbers may be stored for each contact person, the numbers cannot be presented together with the names in the display shown in FIG. 6, and therefore the user now has to select the intended name—by pressing the softkey 5 for "Select"—in order to get a list of the numbers stored for that name. In the shown example, the user selected the person Anna Anderson, and the display showing the corresponding numbers is shown in FIG. 7. Now one of these numbers can be selected, and the call can be initiated which is then communicated to the user by the display shown in FIG. 8. Of the steps described above, especially the extra step from FIG. 6 to FIG. 7 is annoying to many users, especially because typically many of the contact persons are actually stored with only one number, so that this extra step seems superfluous.

As an alternative to the menu path described above, in which several steps are needed before a call to one of the persons stored in the phonebook can be initiated, shortcuts are possible in some phones which can reduce the number of steps. As an example, a press on the down part of the 4-way navigation device 4 or a long press on one of the number/letter keys may take the user directly from the stand-by mode of FIG. 2 to the list of names shown in FIG. 6. Although the user can in this way avoid some of the many steps described above, the extra step from FIG. 6 to FIG. 7 is still needed, and it is no less annoying in this situation.

Figure 9:
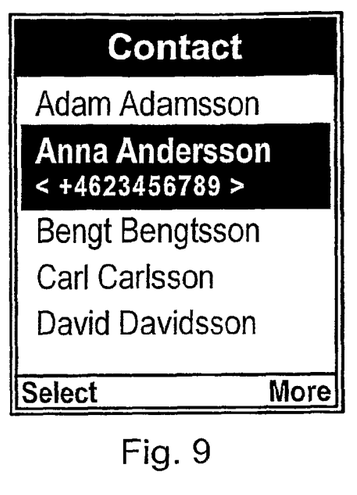
FIG. 9 shows an example of a display presenting a list of contact persons including a default number for a highlighted contact person and an indication that further numbers are stored for this contact person.

Below is described how this annoying extra step can be avoided. The display of FIG. 6 has now been modified as shown in FIG. 9. As it can be seen, one of the numbers for the highlighted contact person, in this case Anna Andersson, is shown in the highlighted area together with the name, so that if this number is the one the user intends to call, it can be selected directly without the need for the extra list of numbers that was shown in FIG. 7. As shown, two arrows before and after the number indicate that further numbers are stored for this contact person. If the shown number is not the intended one, the 4-way navigation device 4 can be used to scroll through the other stored numbers by pressing the left or right side of the device, until the intended number is shown in the highlighted area. This scrolling corresponds to the scrolling that was made earlier in the list of FIG. 7, but now it is made directly in the list of names, so that the extra step to the list of numbers is saved.

Figure 10:
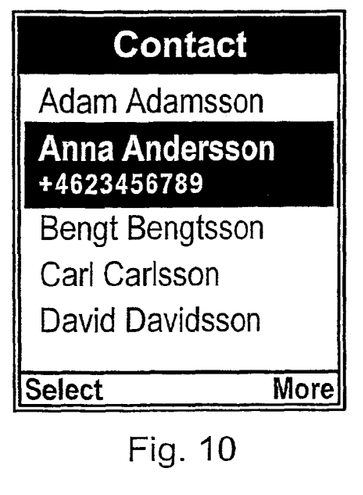
FIG. 10 shows an example of a display presenting a list of contact persons including a number for a highlighted contact person, where only one number is stored for this contact person.

If the number +4623456789 is the only number stored for this contact person, the number will be shown without the two arrows, which indicates that no further numbers are stored. This is illustrated in FIG. 10, and the number can be selected directly. In this way the presentation on the display is the same as for contact persons with several numbers stored.

Further, especially in the case where several numbers are stored for a contact person, the finding of the right number can be facilitated when a small icon identifying the type of the number, such as home, work, mobile or e-mail address, is shown together with the number. An example is shown in FIG. 11, where a small house indicates that the shown number is a home number.

Figure 11:
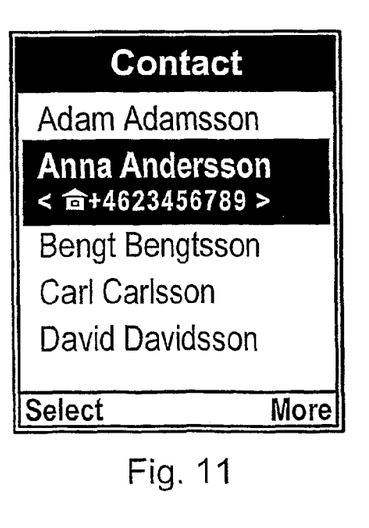
FIG. 11 shows an example of a display similar to FIG. 9, but with an icon identifying the type of number.

It is noted that as a compromise between the known method illustrated in FIGS. 2 to 8 and the suggested method illustrated in FIGS. 9 to 11, it would also be possible to use the extra list of numbers from FIG. 7 only for those contact persons where more than one number is stored, while, in the case of only one number stored for a contact person, the number can be shown together with the name similar to FIG. 10. However, such a solution is inconsistent, because the number of key presses or steps needed is different depending on the number of numbers stored for a given contact person, which is not necessarily known (or remembered) in advance.

As mentioned, in the suggested solution one of the stored numbers for a highlighted contact person is shown as a default number in the highlighted area together with the name. The default number can simply be the first number entered in the list when the contact person was originally saved in the memory of the device, but the user can also at any time select any one of the stored numbers to be the default number.

Alternatively, the default number may be chosen automatically by the device in dependence of the actual use of the device. If the user enters the phonebook in order to send an SMS or an MMS message, the device chooses the mobile number as the default number, and if an e-mail is to be sent, the e-mail address would be selected as default. Similarly, if the user is preparing to make a call, the home number could be chosen. In this way the user will only rarely have to scroll through the numbers, because in most situations the device will automatically suggest as default the number that the user actually intends to use.

An important advantage of the suggested solution is, as mentioned, that one annoying extra step or key press is avoided, so that the user can make phone calls or send messages with as few key presses as possible. When a shortcut is used, as described above, the suggested method allows a call to a person in the phonebook to be made with only two key presses. First, the user presses a number/letter key (long press) or e.g. presses down on the 4-way navigation device 4 to make a shortcut from stand-by mode (FIG. 2) to the phonebook in FIG. 9 or 11, and then, if the right person is highlighted, the call can be made by pressing select (softkey 5). If the right person is not highlighted, the user can scroll through the names until it becomes the case, but this scrolling will of course always be needed. However, there are other advantages, which will be mentioned below.

If a wrong contact person has been selected, the user does not have to go one step back to move to another person on the list. He can just move to another person directly by pressing up or down on the 4-way navigation device. Further, many users always have only one number stored for each contact person. In the prior art solution they would always have to use the extra, superfluous step to go to a list that in any case contains only one name. With the suggested solution they always get the number directly.

Another advantage is that there will always be the same look and the same interaction design for hierarchical phonebooks, i.e. phonebooks having the possibility of storing multiple numbers for each contact person, which is often the case for phonebooks stored internally in a phone, as well as for flat phonebooks, i.e. phonebooks allowing only one number for each person, such as phonebooks stored on a SIM card, service numbers, information numbers, fixed numbers, SOS numbers or the user's own numbers. Also call lists have the same look and the same interaction design.

Although a preferred embodiment of the present invention has been described and shown, the invention is not restricted to it, but may also be embodied in other ways within the scope of the subject-matter defined in the following claims.

The invention claimed is:

1. A method of selecting a number or address from a list stored in a mobile telecommunications device for initiating a call or sending a message from the mobile telecommunications device to the number or address, the list comprising names and one or more numbers or addresses corresponding to each name, the method comprising: displaying on a display of the mobile telecommunications device a list comprising at least some of the stored names, one of the names in the list being highlighted; the highlighted name being displayed in the list on the display of the mobile telecommunications device together with a default one of the one or more numbers and/or addresses corresponding to the highlighted name; and when further numbers or addresses corresponding to the highlighted name are stored, displaying on the display of the mobile telecommunications device together with the default number or address a first icon that provides an indication of whether the list comprises further numbers or addresses corresponding to the highlighted name in addition to the displayed number or address and a second icon that provides an indication of a type of the further numbers or addresses that are stored, wherein when the default number or address is a default number, the further numbers or addresses are one or more numbers, and when the default number or address is a default address, the further numbers or addresses are one or more addresses; wherein the second icon comprises an indication of whether the fresher numbers or addresses are at least one of a home phone number, a mobile phone number, a work phone number, a home address, a work address and an e-mail address.

2. A method according to claim 1, further comprising selecting the displayed default number or address, if it is indicated that this number or address is the only number or address in the list corresponding to the highlighted name.

3. A method according to claim 1, comprising:
scrolling, if it is indicated that the list comprises more than one number or address corresponding to the highlighted name, and if the displayed default number or address is not the one to which a call should be initiated or a message sent, through the numbers or addresses corresponding to the selected name by means of a 4-way navigation device until the number or address to which a call should be initiated or a message sent is displayed; and selecting, when the number or address to which a call should be initiated or a message sent is displayed, the displayed number.

4. A method according to claim 1, wherein the default one of the one or more numbers or addresses corresponding to the highlighted name is selected based on a mode of the telecommunications device.

5. A method according to claim 1 wherein displaying the highlighted name in the list together with a default one of the one or more numbers and/or addresses corresponding to the high-lighted name includes displaying the highlighted name in the list with only one default one of the one or more numbers and/or addresses corresponding to the highlighted name.

6. A method according to claim 5 wherein the highlighted name and the default one of the one or more numbers and/or addresses corresponding to the highlighted name is displayed concurrently on a single display.

7. A method according to claim 1, wherein the list of names, the highlighted name in the list of names and the default one of the one or more numbers and/or addresses corresponding to the highlighted name are displayed concurrently on a single display.

8. A method according to claim 1, wherein the default number is configured to be selected and to initiate a call directly without listing the further stored number or addresses.

9. A mobile telecommunications device configured to select a number or address from a list stored in the mobile telecommunications device for initiating a call or sending a message from the mobile telecommunications device to the number or address, the list comprising names and one or more numbers or addresses corresponding to each name, the mobile telecommunications device being configured to: display on a display of the mobile telecommunications device a list comprising at least some of the stored names, one of the names in the list being highlighted; the highlighted name being displayed in the list on the display of the mobile telecommunications device together with a default one of the one or more numbers and/or addresses corresponding to the highlighted name; and when further numbers or addresses corresponding to the highlighted name are stored, the device is configured to display on a display of the mobile telecommunications device together with the default number or address a first icon that provides an indication of whether the list comprises fresher numbers or addresses corresponding to the highlighted name in addition to the displayed number or address and a second icon that provides an indication of a type of the further numbers or addresses that are stored, wherein when the default number or address is default number, the further numbers or addresses are one or more numbers, and when the default number or address is a default address, the further numbers or addresses are one or more addresses, wherein the second icon comprises an indication of whether the further numbers or addresses are at least one of a home phone number, a mobile phone number, a work phone number, a home address, a work address and an e-mail address.

10. A mobile telecommunications device according to claim 9 wherein the device is further configured to select the displayed default number or address, if it is indicated that this number or address is the only number or address in the list corresponding to the highlighted name.

11. A mobile A telecommunications device according to claim 9, wherein the device is further configured to:
   scroll, if the list comprises more than one number or address corresponding to the highlighted name, and if the displayed default number or address is not the one to which a call should be initiated or a message sent, through the numbers or addresses corresponding to the selected name by means of a 4-way navigation device until the number or address to which a call should be initiated or a message sent is displayed; and
   select, when the number or address to which a call should be initiated or a message sent is displayed, the displayed number.

12. A mobile telecommunications device according to claim 9, wherein the default one of the one or more numbers or addresses corresponding to the highlighted name is selected based on a mode of the telecommunications device.

13. A mobile telecommunications device according to claim 9, wherein the device is further configured to display the highlighted name in the list with only one default one of the one or more numbers and/or addresses corresponding to the highlighted name.

14. A mobile telecommunications device according to claim 13, wherein the device is further configured to display the highlighted name and the default one of the one or more numbers and/or addresses corresponding to the highlighted name on a single display.

15. A mobile telecommunications device according to claim 13, wherein the device is further configured to display the list of names, the highlighted name in the list of names and the default one of the one or more numbers and/or addresses corresponding to the highlighted name concurrently on a single display.

16. A mobile telecommunications device according to claim 13, wherein the default number is configured to be selected and to initiate a call directly without listing the further stored number or addresses.

\* \* \* \* \*

UNITED STATES PATENT AND TRADEMARK OFFICE
CERTIFICATE OF CORRECTION

PATENT NO.        : 8,442,580 B2  
APPLICATION NO.   : 10/580592  
DATED             : May 14, 2013  
INVENTOR(S)       : Ogren Page 1 of 1

It is certified that error appears in the above-identified patent and that said Letters Patent is hereby corrected as shown below:

On Title Page:
Item 73, Assignees, Please correct:
"Sony Mobile Corporation, Lund (SE)"
to read -- Sony Mobile Communications AB, Lund (SE) --

Signed and Sealed this
Thirtieth Day of June, 2015

Michelle K. Lee
*Director of the United States Patent and Trademark Office*